(12) United States Patent
Chen

(10) Patent No.: US 8,110,731 B1
(45) Date of Patent: Feb. 7, 2012

(54) TRANSMISSION LINKAGE FOR DRUM ASSEMBLY

(76) Inventor: Kuo-Chang Chen, Taichung (TW)

( * ) Notice: Subject to any disclaimer, the term of this patent is extended or adjusted under 35 U.S.C. 154(b) by 0 days.

(21) Appl. No.: 12/900,038

(22) Filed: Oct. 7, 2010

(51) Int. Cl.
*G10D 13/02* (2006.01)

(52) U.S. Cl. .................................................. 84/411 R

(58) Field of Classification Search ............... 84/411 R, 84/421, 422.1, 422.2, 422.3
See application file for complete search history.

(56) References Cited

U.S. PATENT DOCUMENTS 7,525,031 B2 * 4/2009 Fisher, IV ................... 84/411 R
7,641,560 B1 1/2010 Sikra

* cited by examiner

*Primary Examiner* — Kimberly Lockett
(74) *Attorney, Agent, or Firm* — Muncy, Geissler, Olds & Lowe, PLLC

(57) ABSTRACT

A transmission linkage for a drum assembly of the present invention is adapted for connecting a pedal unit to a striking portion. The transmission linkage includes a pole a first joint, a second joint, two threaded members and two bearing units. At least one of the first joint and the second joint includes a first unit and a second unit. The first unit and the second unit are rotatable about an axis. The first unit has two arms which are formed with threaded holes. The second unit has two coaxial recesses. The bearing units are carried in the recesses. The threaded units are screwed in the threaded holes, being held by the bearing units. As such, an easy-fabricated transmission linkage is provided.

9 Claims, 5 Drawing Sheets

TRANSMISSION LINKAGE FOR DRUM ASSEMBLY

BACKGROUND OF THE INVENTION

1. Field of the Invention

The present invention relates to a linkage, more particularly to a linkage connecting a pedal unit to a striking portion of a drum assembly.

2. Description of the Prior Art

In some cases, pedal assembly of a percussion instrument may have plurality of pedal units and plurality of striking portions. As such, a linkage is necessary for the pedal assembly. The linkage connects the pedal unit to the striking portion so as to achieve a rotational operative relationship between the pedal unit and the striking portion.

For instance, U.S. Pat. No. 7,641,560 discloses a structure about a linkage. Bearings are disposed in joints of the linkage. Outer surfaces of the bearings are threaded, so that the bearings are assembled in threaded holes of the joints, as shown in FIG. 3 and FIG. 4 of 560'.

However, the structure disclosed in 560' is difficult to be fabricated. The bearings and the threaded holes are small. Also, the bearings are ring shaped. It is difficult for a producer or a user to screw bearings into the threaded holes.

The present invention is, therefore, arisen to obviate or at least mitigate the above mentioned disadvantages.

SUMMARY OF THE INVENTION

The main object of the present invention is to provide a linkage which is easy to be fabricated.

To achieve the above and other objects, a transmission linkage is provided for a drum assembly. The transmission linkage connects a pedal unit to a striking portion of the drum assembly. The transmission linkage of the present invention includes a pole, a first joint, a second joint, two threaded members and two bearing units.

The first joint connects the pole to the pedal unit. The second joint connects the pole to the striking portion. One of the first joint and the second joint comprises a first unit and a second unit. The first unit and the second unit are rotatable about an axis with respect to each other. The first unit comprises a pair of spaced arms. Each arm is formed with a threaded hole. The second unit has two corresponding surfaces and two coaxial containing recesses. The containing recesses are located on the surfaces individually. The axis is defined in the threaded holes and the containing recesses.

Each threaded member comprises a threaded section and an axial section. The axial section extends axially from the threaded section. The threaded section is screwed in the threaded hole. The axial section is received in the containing recess.

Each bearing unit is carried in one of the containing recesses. Each axial section is held by one of the bearing units, so that the axial sections are able to rotate with respect to the containing recesses.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
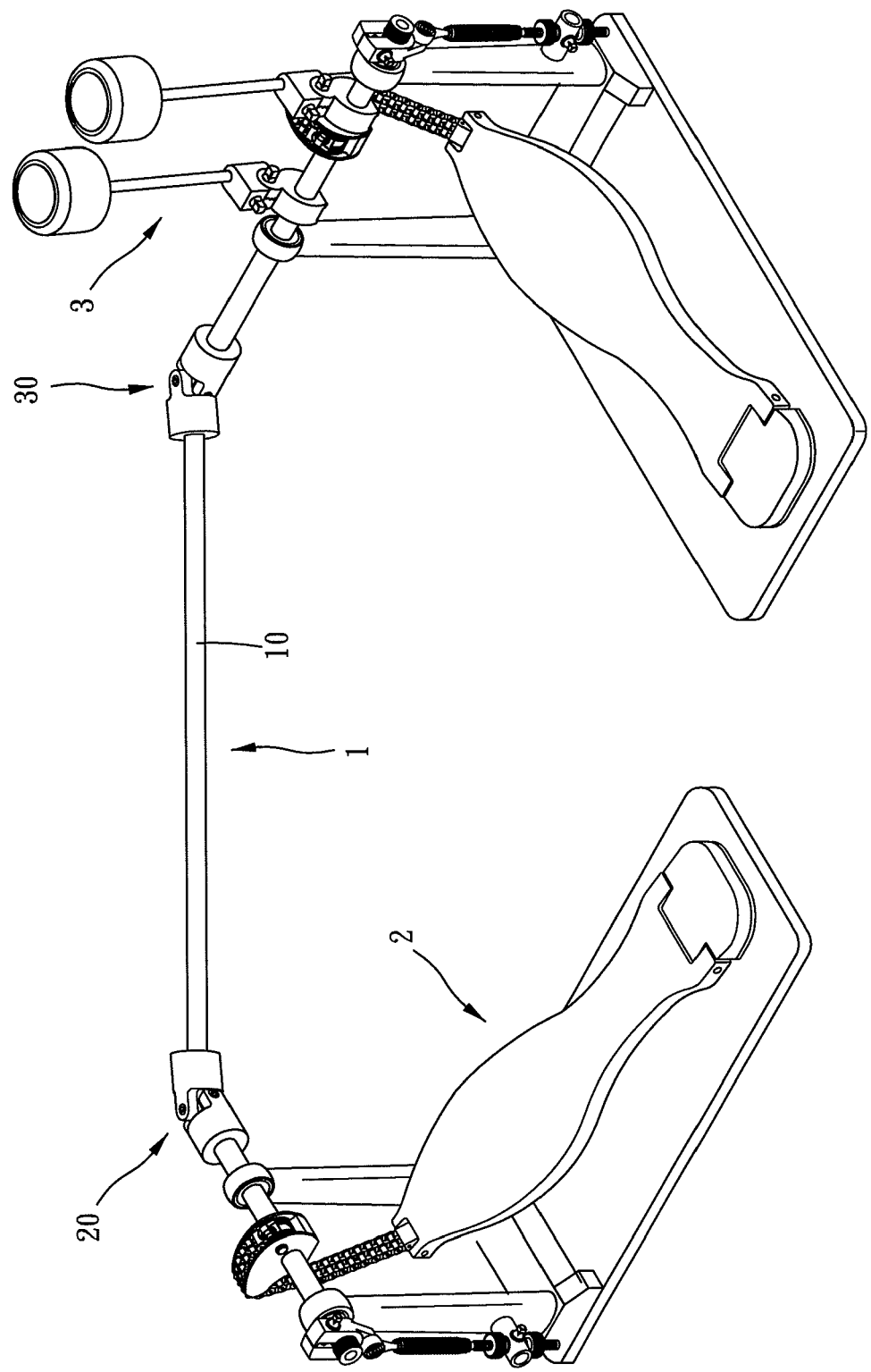
FIG. 1 is a stereogram showing a using state of a first embodiment of the present invention.
Figure 2:
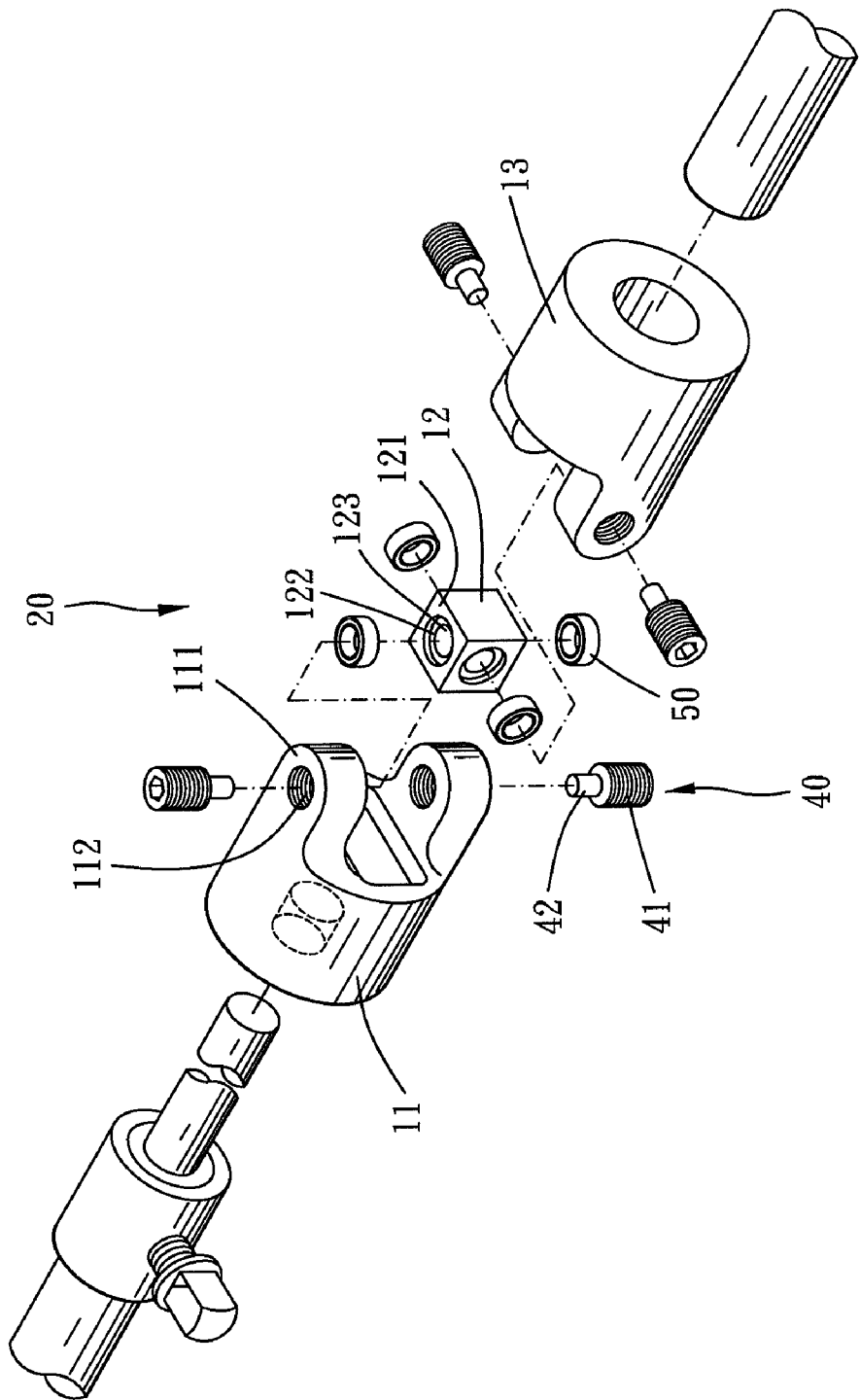
FIG. 2 is a partial breakdown drawing showing a first embodiment of the present invention.
Figure 4:
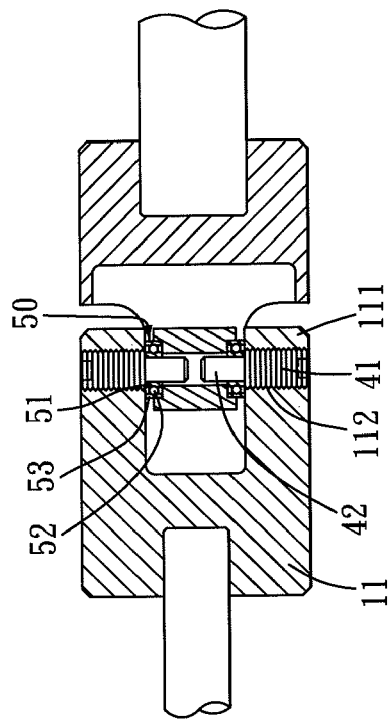
FIG. 4 is an AA profile of FIG. 3.
Figure 3:
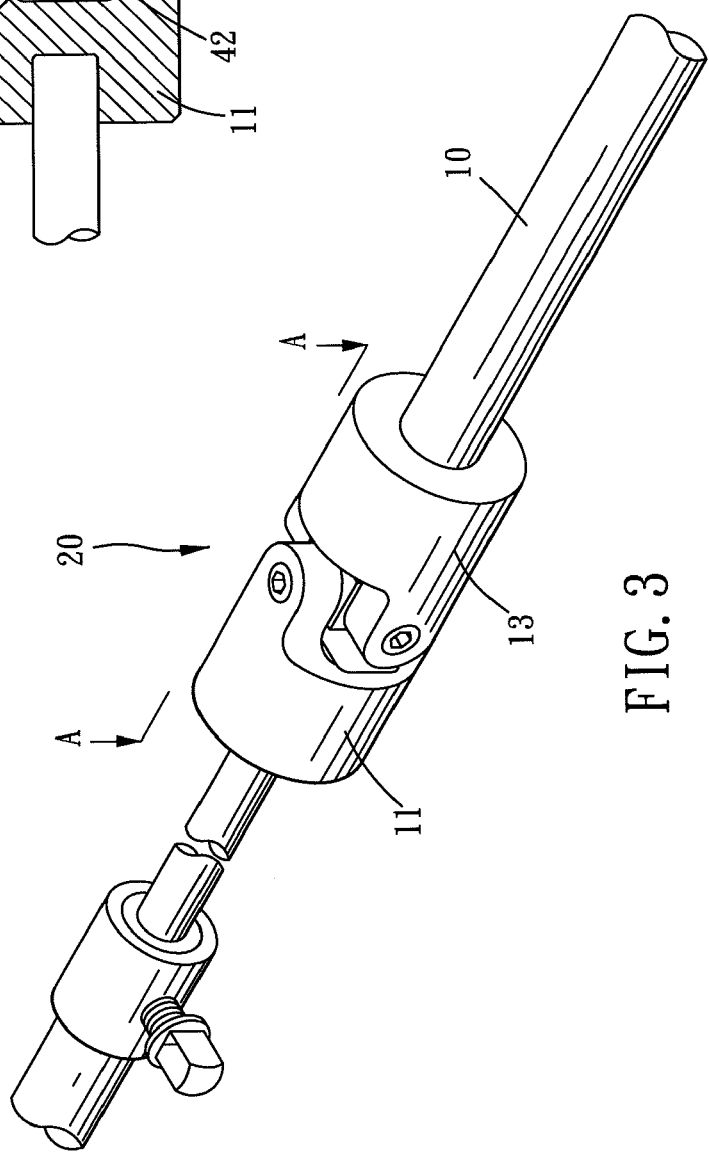
FIG. 3 is a partial combination drawing showing a first embodiment of the present invention.

Please refer to FIG. 1. The transmission linkage 1 of the present embodiment is provided for a drum assembly. The transmission linkage 1 connects a pedal unit 2 to a striking portion 3. The pedal unit 2 includes a pedal, a transmission unit and a rotor. The striking portion 3 includes a rotating member and a hammer. As such, the transmission linkage is able to drive the striking portion 3 to hit a drum when the pedal unit 2 is trod by user.

Please refer to FIG. 1 to FIG. 4 for a preferred embodiment of the present invention. The transmission linkage 1 includes a pole 10, a first joint 20, a second joint 30, two threaded members 40 and two bearing units 50.

The first joint 20 connects the pole 10 to the pedal unit 2. The second joint 30 connects the pole 10 to the striking portion 3. At least one of the first joint 20 and the second joint 30 includes a first unit 11, a second unit 12 and a third unit 13. The third unit 13 connects the second unit 12 to the pole 10. The first unit 11 and the second unit 12 are able to rotate about an axis with respect to each other. The second unit 12 and the third unit 13 are able to rotate about another axis with respect to each other. The axes are perpendicular to each other. In the present embodiment, structure of the first unit 11 is similar to structure of the third unit 13. In the following description, the first unit 11 is taken as a representative case for both of the first unit 11 and the third unit 13.

The first unit 11 includes a pair of spaced arms 111. Each arm 111 is formed with a threaded hole 112. In the present invention, the second unit is cube shaped. The second unit 12 has two corresponding surfaces 121, two containing recesses 122 and an axial hole 123. The containing recesses 122 are coaxial. The axial hole 123 communicates between the containing recesses 122. The containing recesses 122 are located on the surfaces 121 individually. The axis is defined in the threaded holes 112 and the containing recesses 122.

Each threaded member 40 includes a threaded section 41 and an axial section 42. The axial section 42 extends axially from the threaded section 41. The threaded sections 41 are screwed in the threaded holes 112. The axial sections 42 are received in the containing recesses 122.

Each the bearing unit 50 is carried in one of the containing recesses 122. The bearing units 50 are positioned between the first unit 11 and axial sections 42, so that each axial section 42 is held by one of the bearing units 50. The axial sections 42 are able to rotate with respect to the containing recesses 122. In the present embodiment, each bearing unit 50 is composed of an inner case 51, an outer case 52 and plurality of rotating units 53. The rotating units 53 are positioned between the inner case 51 and the outer case 52. The inner case 51 has an annular inner surface. The outer case 52 has an annular outer surface. A diameter of the inner surface is about equal to a diameter of the axial section 42. A diameter of the outer surface is about equal to a diameter of a side surface of the containing recess 122. Preferably, the inner surfaces are slightly larger than the axial hole 123. The axial sections 42 may be received in the axial hole 123 with no contact with the second unit 12. The rotating units 53 above may be ball shaped, cylinder shaped or other similar structure.

Figure 5:
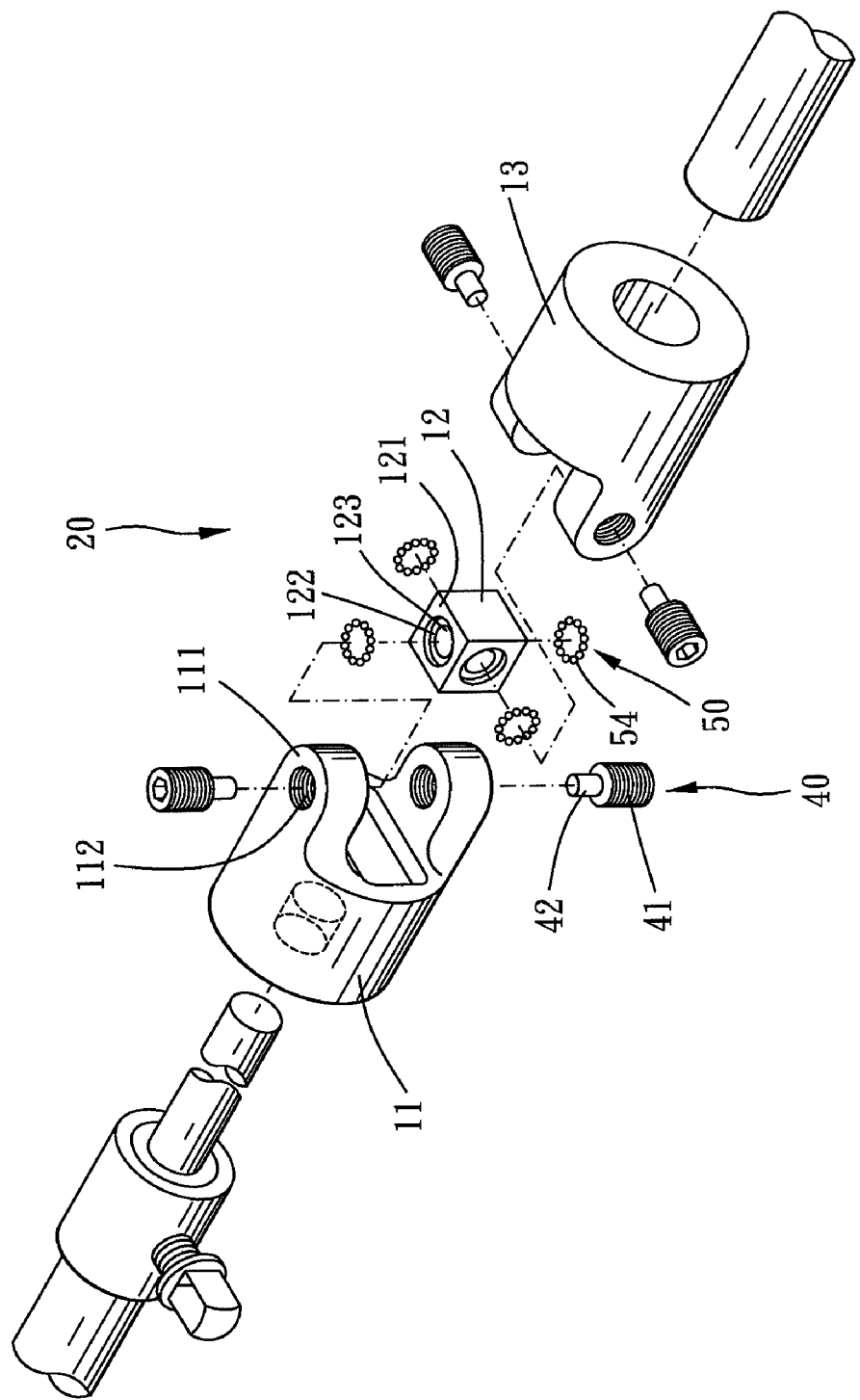
FIG. 5 is a partial breakdown drawing showing a second embodiment of the present invention.

Please refer to FIG. 5. In a second embodiment of the present invention, each bearing unit 50 is composed of plurality of rotating units 54, such as balls. The rotating units 54 are annularly arranged in the containing recesses 122.

Figure 6:
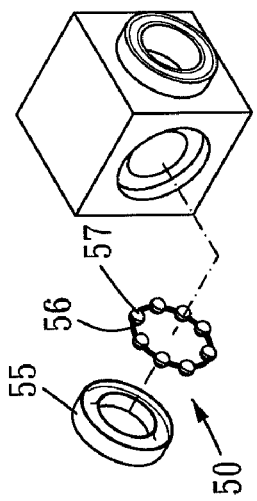
FIG. 6 is a breakdown drawing showing a bearing unit and a second unit of a third embodiment of the present invention.
Figure 7:
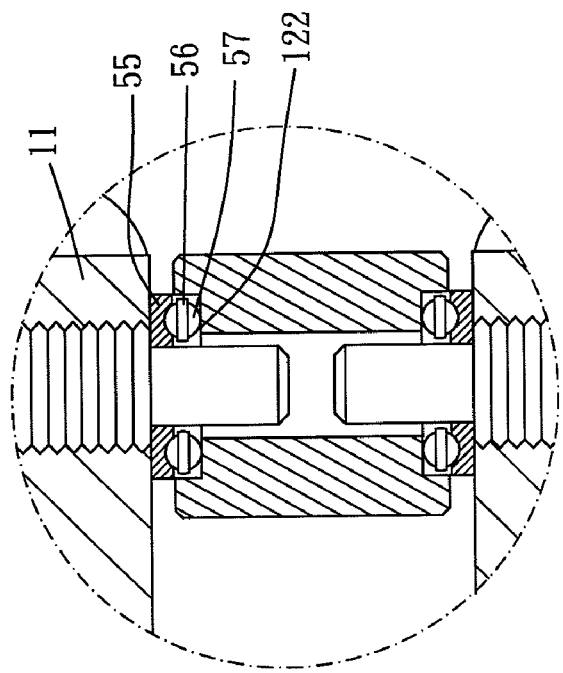
FIG. 7 is a profile showing a third embodiment of the present invention.

Please refer to FIG. 6 and FIG. 7. In a third embodiment of the present invention, each bearing unit 50 is composed of an outer case 55, a retainer 56 and plurality of balls 57. Plurality of grooves are defined by the retainer 56. The grooves are adapted for the balls 57 to be received therein. The outer case 55 is positioned between the balls 57 and the first unit 11. The balls 57 contact directly with the containing grooves 122.

Figure 8:
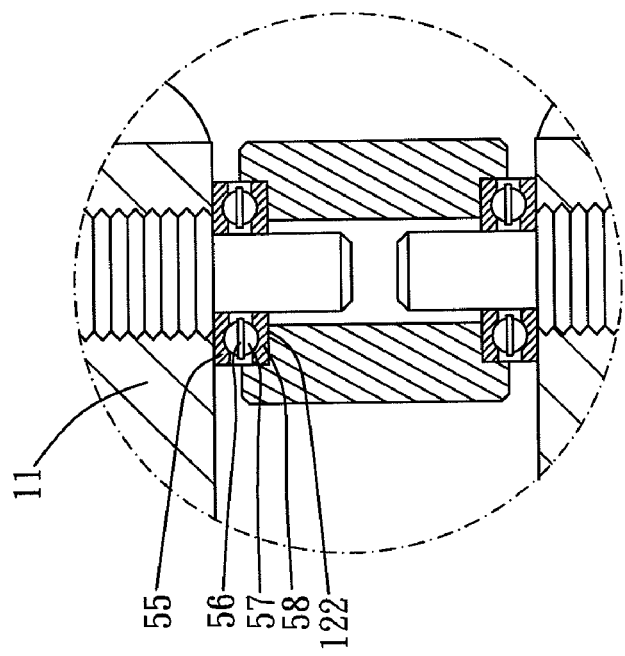
FIG. 8 is a profile showing a fourth embodiment of the present invention.

Please refer to FIG. 8. In a fourth embodiment of the present invention, an inner case 58 may be added in the bearing unit 50 of the third embodiment of the present invention. The inner case 58 is positioned between the balls 57 and the containing recess 122.

Accordingly, bearing units are positioned between the joints. The bearing units are positioned in the recesses directly, being fastened by the threaded members. As such, the bearing units are able to be assembled in the containing recesses easily.

What is claimed is:

1. A transmission linkage for a drum assembly, connecting a pedal unit to a striking portion, the transmission linkage comprising:
   a pole;
   a first joint, connecting the pole to the pedal unit;
   a second joint, connecting the pole to the striking portion;
   wherein at least one of the first joint and the second joint comprises a first unit and a second unit, the first unit and the second unit are rotatable about an axis with respect to each other, the first unit comprises a pair of spaced arms, each arm is formed with a threaded hole, the second unit has two corresponding surfaces and two coaxial containing recesses, the containing recesses are located on the surfaces individually, the axis is defined in the threaded holes and the containing recesses;
   two threaded members, each threaded member comprising a threaded section and an axial section, the axial section extending axially from the threaded section, the threaded section being screwed in the threaded hole, the axial section being received in the containing recess;
   two bearing units, each bearing unit being carried in one of the containing recesses, each axial section being held by one of the bearing units, so that the axial sections are able to rotate with respect to the containing recesses.

2. The transmission linkage of claim 1, wherein each bearing unit is composed of plurality of rotating units, the rotating units are annularly arranged in the containing recesses.

3. The transmission linkage of claim 2, wherein each rotating units is ball shaped.

4. The transmission linkage of claim 1, wherein each bearing unit is composed of an inner case, an outer case and plurality of rotating units, the rotating units are positioned between the inner case and the outer case, the inner case has an annular inner surface, the outer case has an annular outer surface, a diameter of the inner surface is about equal to a diameter of the axial section, a diameter of the outer surface is about equal to a diameter of a side surface of the containing recess.

5. The transmission linkage of claim 4, wherein the second unit further comprises an axial hole, the axial hole communicates between the containing recesses, the inner surfaces are slightly larger than the axial hole.

6. The transmission linkage of claim 1, wherein at least one of the first joint and the second joint further comprises a third unit, the second unit and the third unit are able to rotate about another axis with respect to each other, the axes are perpendicular to each other, the third unit connects the second unit to the pole.

7. The transmission linkage of claim 6, wherein the second unit is cube shaped.

8. The transmission linkage of claim 1, wherein each bearing unit is composed of an outer case, a retainer and plurality of balls, plurality of grooves are defined by the retainer, the grooves are adapted for the balls to be received therein, the outer case is positioned between the balls and the first unit, the balls contact directly with the containing grooves.

9. The transmission linkage of claim 1, wherein each bearing unit is composed of an outer case, an inner case, a retainer and plurality of balls, plurality of grooves are defined by the retainer, the grooves are adapted for the balls to be received therein, the outer case is positioned between the balls and the first unit, the inner case is positioned between the balls and the containing recesses.

* * * * *